Figures 1, 2:
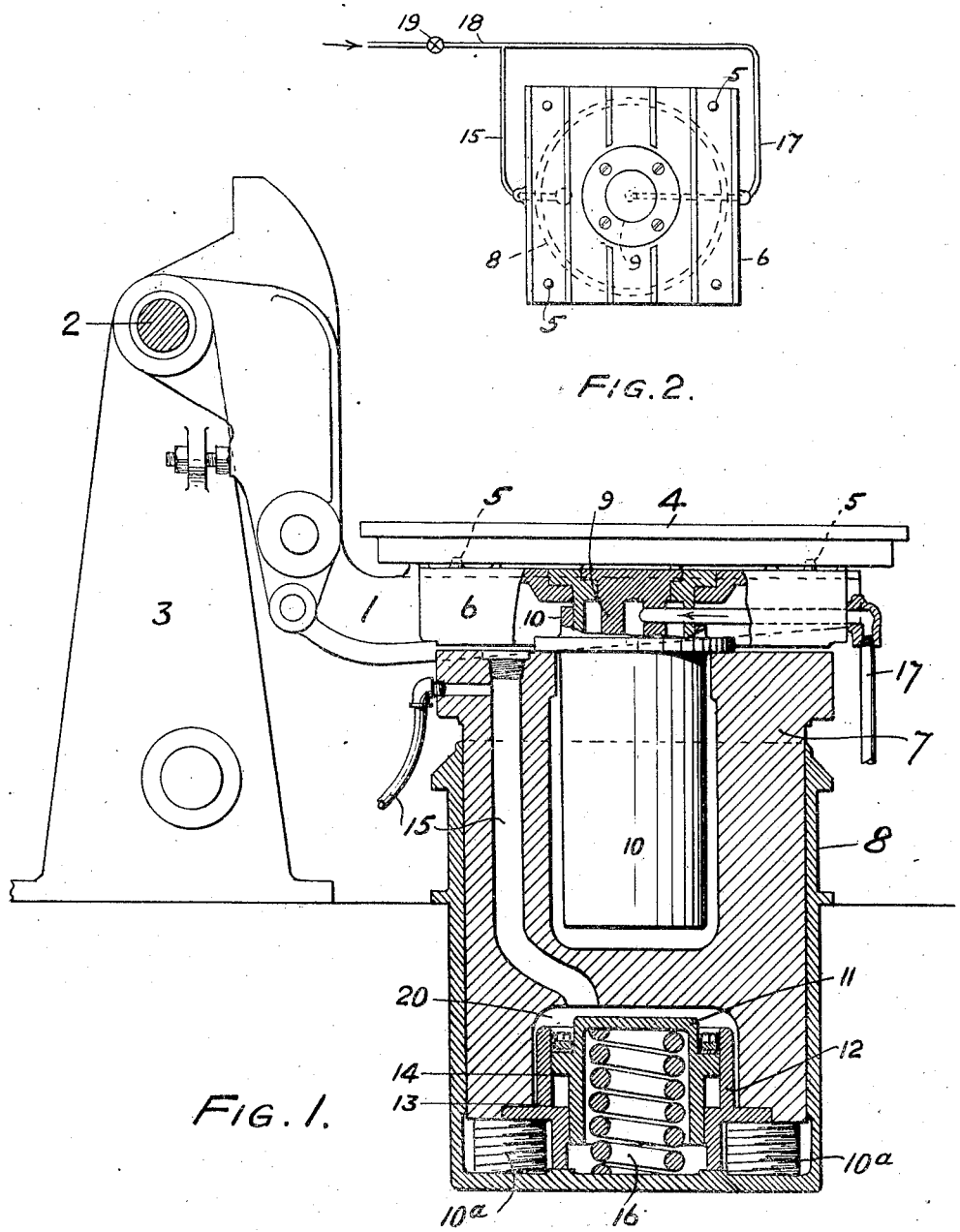

June 22, 1926.

J. T. RAMSDEN 1,589,555

MOLDING MACHINE

Filed Sept. 23, 1925

WITNESS:
Robt. P. Kitchel.

INVENTOR
John T. Ramsden
BY
Augustus B. Stoughton
ATTORNEY.

Patented June 22, 1926.

1,589,555

UNITED STATES PATENT OFFICE.

JOHN T. RAMSDEN, OF PHILADELPHIA, PENNSYLVANIA, ASSIGNOR TO THE TABOR MANUFACTURING COMPANY, OF PHILADELPHIA, PENNSYLVANIA, A CORPORATION OF PENNSYLVANIA.

MOLDING MACHINE.

Application filed September 23, 1925. Serial No. 58,014.

The principal object of the present invention is to improve and simplify the construction and operation of shockless jarring rollover molding machines, and to provide for turning the rollover arms on a fixed fulcrum or center while insuring proper jar ramming and while permitting proper clearance of the dowel pins by which the rollover plate is positioned on the jarring table.

These and other objects hereinafter appearing are accomplished according to my invention by providing means for compelling the jarring table to work from different levels in respect to the level of a fixed rollover fulcrum or axis, i. e. the jarring table to work from the high level when jarring and from the low level when the arms are turned.

The invention further consists in the improvements to be presently described and finally claimed.

In the following description reference will be made to the accompanying drawing in which is illustrated one embodiment selected from other embodiments of the invention for the sake of description and in that drawing, Figure 1 is a view, partly in section and partly in elevation, of so much and of such parts as are necessary for an explanation of the invention, and Fig. 2 is a diagrammatic top or plan view drawn to a reduced scale.

In the drawing the rollover arms 1 are turnable about a fixed fulcrum or center 2 shown as a provision of a pedestal or frame 3. 4 is a rollover plate. 5 are dowel pins for positioning the rollover plate 4 with respect to the jarring table 6. The jarring table 6 is compelled to jar from a high level and to permit the arms 1 to turn from a low level as shown in Fig. 1, and the low level is co-ordinated with the position of the fixed fulcrum 2 to permit the dowel pins 5 to clear when the arms 1 are turned over. 7 is the anvil and 8 is the anvil guide of a typical shockless jarring machine in which the plunger 9, cylinder 10 and their fluid connections 17 operate to raise and lower the jarring table in respect to the anvil. 10$^a$ may be regarded as the usual springs interposed between the anvil and the base of its guide and their function is to lift the anvil in such a way that the collision between it and the descending jarring table and flask occurs when both the jarring table and anvil are traveling in the air above the foundation. The elements 11 and 12 constitute a fluid piston and cylinder arranged under the anvil and adapted to lift it and the jarring table from the level shown in Fig. 1 to a higher level, higher in the present instance by the distance shown between the surfaces 13 and 14. 15 is a fluid connection for operating the piston and cylinder 11 and 12. 16 is a spring under the element 11, which may be regarded as the abutment element and its purpose is to balance at least a part of the weight of the superstructure during jarring so as to avoid the communication of shocks to the foundation. The fluid connections 15 and 17 are designed, constructed and arranged in such a way that the anvil and jarring table are raised to the high level before jarring commences. This can of course be accomplished in a variety of obvious ways. As shown these connections 15 and 17 are branches of a supply pipe 18 controlled by a valve 19, but the connections 15 and 17 are so proportioned that the anvil is lifted to the high level before the jarring starts.

An explanation of the invention can be facilitated by a brief description of one way of operating the molding machine to which the invention is applied. A flask with a stripping plate and a pattern plate are mounted on and properly connected with the rollover plate. Sand is put into the flask and jar rammed. Afterward the arms are turned over toward the left in Fig. 1 and the flask deposited upon a support, not shown because too well understood, and the flask and stripping plate are lifted from the pattern plate by any suitable means, not shown because too well understood to require illustration. Of course if preferred the flask can be dropped or lowered in order to draw the pattern and in that case the stripping plate may be dispensed with.

The mode of operation of the present invention may be described as follows:

The flask with its pattern equipment and sand is placed on the rollover plate 4 in the low position thereof shown in Fig. 1. Fluid under pressure is admitted as by opening the valve 19. The result of this is that fluid under pressure entering the space 20 lifts the anvil 7 and with it the jarring table 6 and rollover plate and mold and its accessories to the high level position. The spring 16 is of sufficient strength to permit this to occur without material compression. Another result of the admission of fluid under pressure is that after the jarring table and parts carried therewith have been lifted to the higher level as described the jarring action occurs and the operation is shockless for the reasons set forth. Upon completion of the jar ramming of the mold the fluid pressure connections are evacuated or exhausted with the result that the parts return to the position shown in Fig. 1. The arms 1 are rolled over in any appropriate way by power or otherwise and as the arms 1 start to roll over the dowel pins 5 are cleared because the fixed axis 2 and the level of the jarring table are properly co-ordinated to accomplish that result.

It will of course be understood that when the arms 1 are rolled over the rollover plate is secured to them and that when the flask is jar rammed the arms and rollover plate are disconnected. Those skilled in the art know without further explanation the construction and operation of locking mechanism usually employed for those purposes.

During the jar ramming operation the rollover arms 1 occupy a position determined by the location of the fixed fulcrum or center 2, and by a limit stop shown as a provision of the pedestal or frame, and that predetermined position of the arms is appropriate not only for providing proper draft for the dowel pins when the rollover table is lifted vertically or is rolled over but also for permitting proper operation of the locking and unlocking of the mechanism by which the arms and rollover table are connected and disconnected when the rollover table is on the jarring table.

It will be obvious to those skilled in the art to which the invention relates that modifications may be made in details of construction, arrangement and matters of mere form without departing from the spirit of the invention which is not limited in respect to such things or otherwise than the prior art and the appended claims may require.

I claim:

1. A molding machine having rollover arms, a fixed fulcrum or center about which the rollover arms are turnable, a rollover plate, dowel pin connection for the rollover plate, a jarring table compelled to jar from a high level and to permit the arms to turn from a low level co-ordinated with the position of the fulcrum to permit the dowel pins to clear, an anvil and anvil guides, a jarring piston and cylinder interposed between the anvil and jarring table, a fluid piston and cylinder provided between the anvil and anvil guide for lifting the anvil and with it the jarring table to the high level, and means for compelling the last named piston and cylinder to lift before jarring starts.

2. A molding machine having rollover arms, a fixed fulcrum or center about which the rollover arms are turnable, a rollover plate, dowel pin connection for the rollover plate, a jarring table compelled to jar from a high level and to permit the arms to turn from a low level co-ordinated with the position of the fulcrum to permit the dowel pins to clear, an anvil and anvil guides, a jarring piston and cylinder interposed between the anvil and jarring table, a fluid piston and cylinder provided between the anvil and anvil guide for lifting the anvil and with it the jarring table to the high level, means for compelling the last named piston and cylinder to lift before jarring starts, and a spring co-operating with the abutment element of the last named piston and cylinder to balance weight of the anvil.

3. A molding machine having rollover arms, a fixed fulcrum or center about which the rollover arms are turnable, a rollover plate, dowel pin connection for the rollover plate, a jarring table compelled to jar from a high level and to permit the arms to turn from a low level co-ordinated with the position of the fulcrum to permit the dowel pins to clear, and means for lifting the jarring table to the high level before jarring starts.

JOHN T. RAMSDEN.